2,899,378

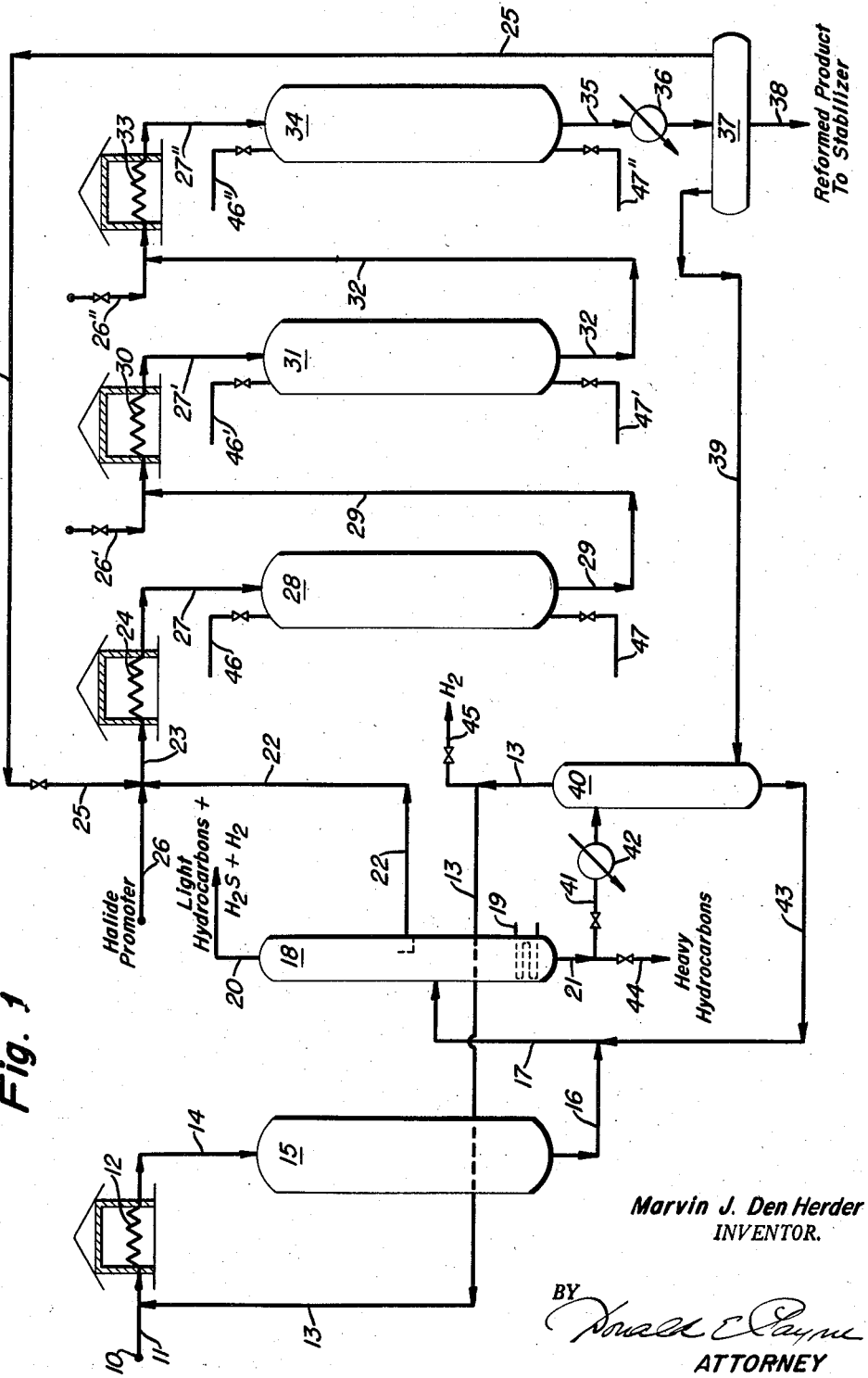

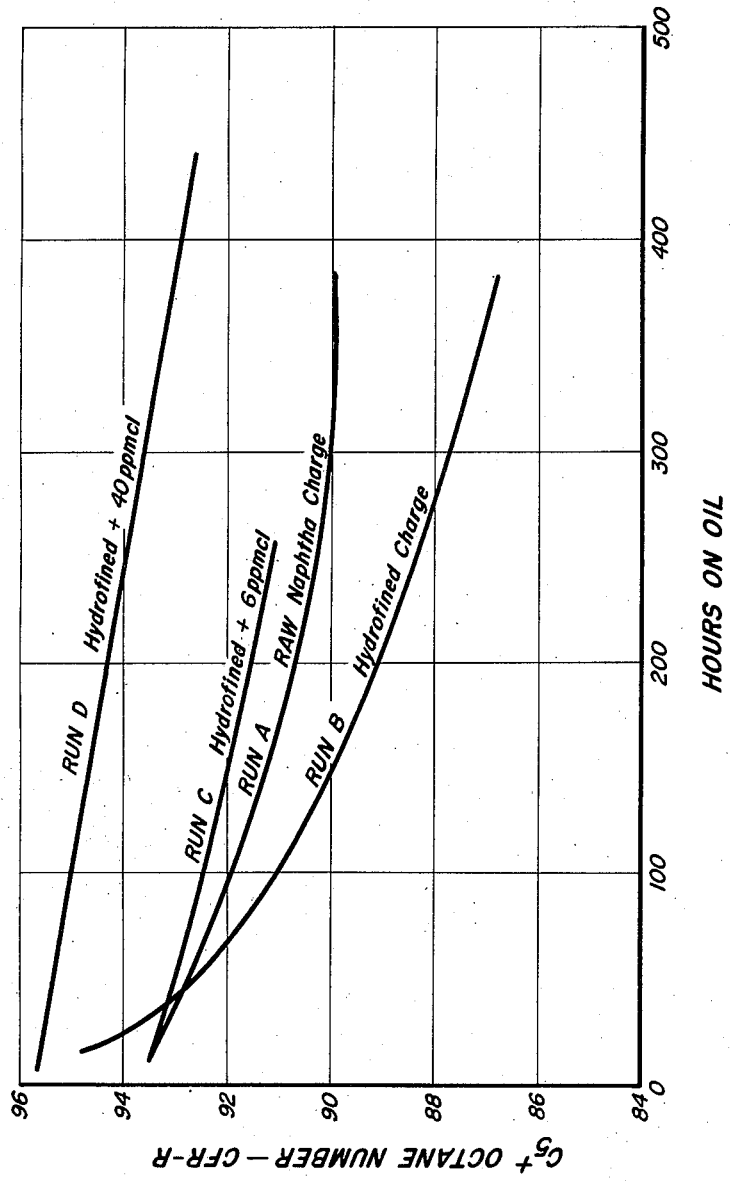

INCREASING PLATINUM CATALYST ACTIVITY FOR HYDROFORMING HYDROFINED NAPHTHA

Marvin J. Den Herder, Chicago, Ill., assignor to Standard Oil Company, Chicago, Ill., a corporation of Indiana Application December 27, 1954, Serial No. 477,715

3 Claims. (Cl. 208—65)

This invention relates to improving platinum catalyst activity for hydroforming a naphtha charge which has previously been hydrofined for effecting substantial desulfurization and it pertains more particularly to an improvement in the Ultraforming process (The Petroleum Engineer, volume XXVI, April 1954, page C–36).

It has previously been proposed to desulfurize a naphtha charging stock prior to hydroforming with platinum catalysts because large amounts of sulfur have been found to be deleterious to platinum catalyst activity under hydroforming conditions. While hydrofining is effective for removing most of the sulfur and nitrogen from naphthas, it has been found that with many charging stocks hydrofining removes desirable components of an initial naphtha charge and/or converts original components into other forms with the net result that the hydrofined charge causes a different type of platinum catalyst deactivation in the subsequent hydroforming step. An object of this invention is to provide a method and means for preventing or minimizing the increased rate of deactivation of platinum catalyst which is caused by the naphtha charging stock thereto having been initially hydrofined. Ohter objects will be apparent as the detailed description of the invention proceeds.

In practicing the invention a sulfur- and/or olefin-containing naphtha charge is hydrofined with any known hydrofining or hydrodesulfurization catalyst under conditions to substantially eliminate its sulfur content and to produce a saturated hydrofined naphtha having otherwise substantially the same boiling range and composition as the original charge. Since the hydrofining necessarily removes at least a portion of the halide (usually chloride) content of the original raw charge, I add back to the hydrofined naphtha about 0.1 to 10, but less than 40, parts per million of a halogen in the form of a halogen or halogen-affording substance before contacting the hydrofined naphtha with platinum-on-alumina catalyst under hydroforming conditions. The halogen-affording substance may be a halogen itself, such as chlorine or bromine, or it may be a halide acid such as HCl, HF or HBr, or it may be an alkyl halide such as tertiary butyl chloride.

The halide is preferably added to the hydrofined charge only in catalyst-promoter quantities since larger amounts of halide, i.e. upwards of about 40 parts per million, cause excessive hydrocracking which it is desired to minimize. Most virgin naphthas naturally contain about 0.1 to 10 parts per million of halide and this amount of promoter halide is usually adequate for catalyst promoting effect when the virgin naphtha is of sufficiently low sulfur content that it can be hydroformed without initial hydrofining. The hydrofining step, particularly in the case of Mid-Continent naphtha, removes some of the halide from the original charge, as well as removing sulfur and nitrogen therefrom, and removes or alters other components of the charge so that a different type of catalyst deactivation is encountered. The addition of sufficient halide to compensate for halide lost in the hydrofining step causes a decrease in the catalyst activity decline rate; this better activity maintenance is obtained without substantially increasing the amount of carbon formation over that which would be obtained by hydroforming with platinum-on-alumina catalyst a hydrofined naphtha to which no halide has been added back.

The invention is particularly applicable to an Ultraforming process which operates at relatively low pressures of about 100 to 350 p.s.i. and high inlet temperatures of the order of 900 to 950° F. whereby hydrocracking of paraffins is minimized and the conversion of paraffins to aromatics by dehydrocyclization is maximized, the Ultraforming process being regenerative. The addition of halide in promoter amounts to the hydrofined Ultraformer charge is preferably substantially constant throughout each on-stream period and, the halide promoter may be separately introduced into each reactor since the purpose of the promoter is to increase overall catalyst activity and the amounts employed are too small to have any appreciable effect on cracking and carbon formation.

The invention will be more clearly understood from the following detailed description of a preferred example read in conjunction with the accompanying drawings which form a part of the specification and in which:

Figure 1 is a schematic flow diagram of the improved hydrofining-Ultraforming system incorporating the addition of halide promoter to hydrofined charge, and Figure 2 is a graph illustrating the promotional effect of added halide on platinum catalyst activity (as indicated by product octane number) when employed in a hydrofined naphtha.

While the invention is applicable to charging stocks from any crude source, it will be described as applied to the conversion of a Mid-Continent naphtha having an end point of about 360° F., a CFR–R octane number of about 45, a sulfur content of about .03 percent and a chloride content of about 5 p.p.m. (parts per million), such stock usually consisting of about 50 volume percent paraffins, 42 volume percent naphthenes and 8 volume percent aromatics. The corresponding Gulf Coast naphtha would be richer in naphthenes and aromatics and contain less paraffins while an Arkansas naphtha would be richer in paraffins but would contain less naphthenes and aromatics and also somewhat less chloride, i.e. about 2 parts per million. While the invention is described as applied to virgin naphthas, it will be understood that it is also applicable to naphthas from catalytic cracking, thermal cracking, coking and the like, either alone or in admixture with virgin naphthas.

The Mid-Continent naphtha charge is introduced from source 10 through line 11 to preheater 12 along with about 600 to 1500 cubic feet of hydrogen-rich gas per barrel of charge from line 13. The naphtha and hydrogen-rich gas are heated to a temperature in the range of about 600 to 800, e.g. 750° F., under a pressure in the range of about 150 to 1500 p.s.i., e.g. about 300 p.s.i., and introduced by transfer line 14 into hydrofining reactor 15 wherein it is contacted with a hydrofining catalyst which is preferably cobalt oxide-molybdenum oxide on alumina. Hydrofining catalysts may be made by impregnating known molybdena-on-alumina catalysts with an aqueous solution of a cobalt compound or by the method described in U.S. Hendricks 2,687,381. However, any known type of hydrodesulfurization catalyst may be employed which is effective for reducing the sulfur content of the charge to the desired low level; platinum-on-alumina catalysts have been found highly satisfactory for this purpose and, although bauxite and fuller's earth may be used in some circumstances, it is preferred to employ catalysts which are more effective for hydrofining. The space velocity in the hydrofining or desulfurization zone will depend upon the particular charging stock and catalyst; generally speaking, the space velocity should be of the order of 1 to 10 liquid volumes of charging stock per hour per volume of catalyst in the reactor. It is preferred that the hydrofining be effected under conditions for saturating any olefins in the charge and for removal of contaminants, particularly nitrogen compounds and excessive amounts of sulfur. Hydrofining at higher pressures is usually more effective than hydrofining at lower pressures. The hydrofining step itself is well known to those skilled in the art and requires no further detailed description.

The effluent from the hydrofining reactor is introduced by lines 16 and 17 into fractionator 18 which is provided with reboiler 19. As described in co-pending application Serial No. 379,810, filed September 14, 1953, now Patent No. 2,800,428, granted July 23, 1957, the heat in the effluent stream from the hydrofining reactor may be employed in reboiler 19. Fractionator 18 is operated under conditions to remove light hydrocarbons and gases including $H_2S$ overhead through line 20 and, if desired, to remove high boiling hydrocarbons through line 21 to control end-point.

In the specific example the heart cut of the hydrofined product which boils in the range of about 200 to 360° F. and which has been substantially freed from $H_2S$ and water as well as light hydrocarbons, is withdrawn by lines 22 and 23 to preheater 24 of the Ultraformer system. Recycled hydrogen-rich gas is introduced to the Ultraformer charge through line 25 in amounts of about 2,000 to 8,000 cubic feet per barrel, e.g. about 4,000 cubic feet per barrel. Since the hydrofining operation has removed most of the 5 parts per million of chloride originally contained in the naphtha charge, a promotional amount (0.1 to 10 parts per million) of chloride is introduced through line 26 by a rotameter or other known measuring and/or injection means. As above stated, the halide may be in the form of a halogen, halide acid or an alkyl halide. The halide should be introduced only in promotional amounts since larger amounts cause excessive hydrocracking and coke formation which is undesirable. As hereinabove pointed out, the halide promoter may be separately introduced into each reactor, i.e. may be introduced by line 26' to the effluent stream in line 29 and by line 26" to the effluent stream in line 32 as illustrated in the drawing.

The hydrofined charge, hydrogen and halide promoter, are heated in preheater 24 to a temperature in the range of about 850 to 950° F. and introduced by line 27 to the first Ultraformer reactor 28 which is operated under a pressure of about 150–400 p.s.i., e.g. about 300 p.s.i. The catalyst in reactor 28 is of the platinum-on-alumina type and it may contain about .1 to 2 percent or more of platinum although, for practical purposes, approximately .5 weight percent is preferred. The catalyst may be prepared by contacting an aqueous solution of chloroplatinic acid containing about 3.5 grams of platinum per liter with an ammonium sulfide to obtain a stable aqueous solution which is then combined with alumina sol prepared as taught in U.S. Re. 22,196, the resulting mixture then being dried and calcined (note U.S. 2,659,701). Alternatively, the catalyst may be prepared as taught by Komarewsky in Oil and Gas Journal, June 24, 1943, page 90 et seq. In such methods of catalyst preparation, the final catalyst contains at least a part of the chlorine introduced with the chloroplatinic acid, but, when only .5 percent platinum is incorporated in the catalyst, the amount of chloride introduced will not be sufficient to result in excessive amounts of hydrocracking under Ultraforming conditions. The catalyst should be substantially free from sodium, iron and molybdenum oxides but it may contain small amounts of silica, titania, boria, and the like, and it may contain additional halide, such as fluoride, provided the amount thereof is low enough to avoid excessive hydrocracking. Other catalyst preparation methods may be employed and other types of supports may be used but, since no novelty is claimed in the catalyst per se, no further description thereof is necessary.

With an active catalyst the weight space velocity in reactor 28 may be about 4 to 10 pounds of charge per hour per pound of catalyst therein and the endothermic nature of the reaction will result in a temperature drop across the reactor so that the effluent withdrawn through line 29 may be at a temperature of about 800 to 850° F. This effluent is reheated in heater 30 to a temperature in the range of 850 to 950° F. and passed through the second reactor 31 which preferably contains the same amount of the same type of catalyst employed in reactor 28. Here again, due to the endothermic nature of the conversion, the reactor effluent withdrawn through line 32 at a temperature in the range of about 825 to 875° F. is passed through reheater 33 and then introduced into reactor 34 with an inlet temperature in the range of about 850 to 950° F., reactor 34 likewise containing the same amount of the same type of catalyst as in reactors 28 and 31. For some charging stocks additional reheater-reactor stages may be desirable. The final reactor effluent is withdrawn through line 35 and cooler 36 to separator 37 which may be operated at about 100° F. for separating hydrogen-rich gas from liquid product. The liquid product is then withdrawn through line 38 to a stabilizer; if the initial charge has an end point substantially greater than about 360° F., it may also be desirable to fractionate the final liquid product to remove heavy ends therefrom.

Most of the separated hydrogen-rich gas is recycled by line 25 for introduction into line 23 as hereinabove described. The net amount of produced hydrogen is introduced by line 39 to absorber 40 wherein it is scrubbed with heavy naphtha introduced from line 21 through line 41 and cooler 42 for recovering condensable hydrocarbons. The rich absorber oil is returned by line 43 and line 17 to fractionator 18. The net production of heavy hydrocarbons is withdrawn through line 44. The hydrogen-rich gas from the top of absorber 40 is introduced by line 13 to line 11 as hereinabove described in order to supply the hydrogen required for the hydrofining step, any additional hydrogen being withdrawn from the system by line 45.

The Ultraforming system is described in more detail in U.S. 2,773,014, and the combination of hydrofining with hydroforming is described in more detail in U.S. 2,800,-428. In the Ultraforming system a "swing reactor" (not shown) is usually employed so that it may be substituted for any one of reactors 28, 31 and 34 when the latter require regeneration and/or rejuvenation. Connections 46, 46' and 46" and 47, 47' and 47" are for the purpose of supplying purge gas, regeneration gas, rejuvenation gas, hydrogen and stripping gas to reactors 28, 31 and 34, respectively, in order to provide for regeneration and rejuvenation. With a regenerative hydroforming system such as Ultraforming, catalyst activity may be restored in each reactor from time to time so that there is no serious detriment to a slight decline in catalyst activity during each on-stream period. For example, when it is desired to produce a 92 octane number product, than 92 octane number and, after 100 hours or so, the product may be somewhat lower than 92 octane number, but it is desirable that the total on-stream period be several hundred hours before the product pool falls below the 92 octane limit at which time regeneration and rejuvenation is employed.

To demonstrate the results obtainable and show the effect of adding back limited amounts of chloride to a hydrofined charging stock:

Run A was made by hydroforming a raw Mid-Continent naphtha over platinum-on-alumina catalyst at 900° F. and 275 p.s.i.g., with a space velocity of 2 volumes of oil per hour per volume of catalyst, and with 5000 cubic feet of recycled hydrogen per barrel of stock charged, with no scrubbing of recycled hydrogen.

Run B was made under substantially the same conditions as Run A on the naphtha charge after it had been hydrofined over platinum-on-alumina catalyst to effect desulfurization, inspections of the raw naphtha and hydrofined naphtha being approximately as follows:

|  | Raw | Hydrofined |
|---|---|---|
| ASTM dist., vol. percent: | | |
| IBP | 208 | 210 |
| 10 | 239 | 237 |
| 50 | 278 | 271 |
| 90 | 327 | 320 |
| Max | 360 | 353 |
| Hydrocarbon type, analysis, vol. percent: | | |
| Paraffins | 50 | 49 |
| Olefins | 0 | 0 |
| Naphthenes | 41.5 | 42 |
| Aromatics | 8.5 | 9 |
| CFR-R octane number | 44 | 46.7 |
| API gravity | 55.2 | 55.7 |
| Sulfur, p.p.m | 280 | 2 |
| Chlorine, p.p.m | 6 | 1 |
| Nitrogen, p.p.m | 4 | 3 |

Run C was made under the conditions of run A on the hydrofined charge with about 6 p.p.m. of chlorine added back.

Run D was made under the conditions of run A on the hydrofined charge with about 40 p.p.m. of chlorine added back.

In each run, the $C_{5+}$ fraction of the product was tested for CFR-R octane number from time to time during the course of the run and the data thus obtained were plotted to show the rate of catalyst activity decline as measured by said octane numbers. The plotted data are shown in Figure 2, from which it will be noted that the activity decline rate for the hydrofined charge (run B) was much more rapid than for the raw charge. By adding back to the hydrofined charge (run C) the 6 p.p.m. of chlorine, the activity decline rate was substantially the same as that of raw charge (run A). By adding back 40 p.p.m. of chlorine the activity decline rate was still substantially the same as that of the raw charge, but the activity level was higher. The difference in the slope of curve B from that of curves A, C and D shows that by adding back chlorine to hydrofined naphtha charge the unduly rapid rate of catalyst activity decline can be substantially avoided.

While the 40 p.p.m. of chlorine addition increased the overall activity of the catalyst, it also increased the rate of cracking and of carbon formation as is shown by the following data:

|  | Hours on stream | Coke on cat., weight percent | Chloride on cat., weight percent | Percent coke/100 hrs. |
|---|---|---|---|---|
| Run A | 560 | 2.3 | .48 | .41 |
| Run B | 400 | 6.2 | .065 | 1.55 |
| Run C | 280 | 4.2 | .67 | 1.49 |
| Run D | 520 | 9.5 | 1.06 | 1.82 |

Since it is desirable to minimize hydrocracking and coke formation, the amount of chloride added back should not exceed about 10 p.p.m., i.e. it should be an amount sufficient to at least compensate for the chloride lost in the hydrofining step, but it should be small enough to prevent more coke formation than would be obtained with hydrofined naphtha. The addition of 6 p.p.m. of chloride to hydrofined charge in this case showed even less coke formation than was obtained with the hydrofined charge, and it did not cause an appreciable increase in the chloride content of the catalyst, which likewise appears to be desirable because excessive amounts of chloride on the catalyst appear to promote hydrocracking and coke deposition.

Although it is known that halides are cracking promoters (U.S. 2,213,345), reforming promoters (U.S. 2,194,186), hydrocracking promoters (U.S. 2,119,647), and hydrogenation promoters (Jour. Am. Chem. Soc. 58, September 1936, p. 1594 et seq.), it was not heretofore appreciated that virgin naphthas contained sufficient chloride to have a promotional effect in platinum-on-alumina catalyst hydroforming operations, such chloride being lost in a hydrofining operation nor that the use of halide promoters in a hydrofined charge would decrease the rate of catalyst deactivation. With the Mid-Continent naphtha tested, the addition of 6 p.p.m. of halide was found to alter the decline rate of the catalyst activity curve and to restore it to the decline rate of unhydrofined naphtha. The hydrofining operation is desirable in order to prevent the excessive sulfur level in the platinum hydroformer from causing its type of deactivation. By this invention, the detrimental effect of hydrofining is minimized and it is thus possible to obtain greater yields of higher octane number products for longer on-steam operating periods in the Ultraforming process than has heretofore been possible.

I claim:

1. In the process of producing high octane number motor fuel from a low octane number naphtha containing both sulfur and chloride wherein the naphtha is hydrofined under conditions to remove most of said sulfur and chloride, then fractionated to remove water, light hydrocarbons and hydrogen sulfide and then contacted in at least initial, intermediate and final stages with platinum-on-alumina catalyst under hydroforming conditions, the method of eliminating the type of catalyst deactivation which would otherwise be caused by said chloride removal without substantially increasing the rate of cracking and carbon formation, which method comprises introducing into the hydrofined naphtha after the fractionation step and prior to the final hydroforming stage an amount of chloride in the range of about .1 to 10 parts per million, adding at least a part of said chloride to the effluent stream from the first hydroforming stage before it enters the last hydroforming stage, contacting said naphtha with said platinum-on-alumina catalyst in each of said stages under pressures in the range of 150 to 400 p.s.i. at inlet temperatures in the ranges of about 850 to 950° F. until the activity of the catalyst declines in at least one of said stages, and regenerating the catalyst in each stage when the activity thereof declines below that required for obtaining a product of desired octane number.

2. The method of claim 1 which includes the step of adding at least a part of said chloride to the effluent stream from the first stage before it enters the intermediate stage.

3. In the process of producing high octane number motor fuel from a low octane number, sulfur-containing naphtha wherein the naphtha is hydrofined under conditions to remove most of said sulfur and most of any chloride which said naphtha may contain, wherein water, light hydrocarbons and hydrogen sulfide are removed from the hydrofined naphtha and wherein said hydrofined naphtha is thereafter contacted in at least initial, intermediate and final stages with platinum-on-alumina catalyst under hydroforming conditions, the improved method of operation which comprises introducing into the hydrofined naphtha after the removal of hydrogen sulfide therefrom and prior to the final hydroforming stage an amount of chloride in the range of about .1 to 10 parts per million, adding at least a part of said chloride to the effluent stream from the first hydroforming stage before it enters the last hydroforming stage, maintaining the pressure in the hydroforming stages in the range of about 150 to 400 p.s.i. under conditions to produce a product having a desired octane number without suffering a yield loss due to hydrocracking and regenerating the catalyst in the respective hydroforming stages when there has been a decline in the activity of the catalyst therein.

References Cited in the file of this patent

UNITED STATES PATENTS

| | | |
|---|---|---|
| 2,479,100 | Haensel | Aug. 16, 1949 |
| 2,573,149 | Kassel | Oct. 30, 1951 |
| 2,596,145 | Grote | May 13, 1952 |
| 2,641,582 | Haensel | June 9, 1953 |
| 2,642,384 | Cox | June 16, 1953 |
| 2,691,623 | Hartley | Oct. 12, 1954 |

UNITED STATES PATENT OFFICE

CERTIFICATE OF CORRECTION

Patent No. 2,899,378

August 11, 1959

Marvin J. Den Herder

It is hereby certified that error appears in the printed specification of the above numbered patent requiring correction and that the said Letters Patent should read as corrected below.

Column 4, line 68, after "product," insert -- the initial on-stream operation may give a product higher --.

Signed and sealed this 1st day of March 1960.

(SEAL)
Attest:
KARL H. AXLINE
Attesting Officer

ROBERT C. WATSON
Commissioner of Patents